(12) United States Patent
Shukla et al.

(10) Patent No.: US 7,739,135 B2
(45) Date of Patent: Jun. 15, 2010

(54) ASYNCHRONOUS FAULT HANDLING IN PROCESS-CENTRIC PROGRAMS

(75) Inventors: Dharma Shukla, Sammamish, WA (US); Bob Schmidt, Woodinville, WA (US); Mayank Mehta, Redmond, WA (US); Nathan Talbert, Seattle, WA (US); Akash J. Sagar, Redmond, WA (US); Karthik Raman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 378 days.

(21) Appl. No.: 11/393,093

(22) Filed: Mar. 30, 2006

(65) Prior Publication Data

US 2007/0234129 A1 Oct. 4, 2007

(51) Int. Cl.
| | |
|---|---|
| G06F 11/00 | (2006.01) |
| G06F 17/50 | (2006.01) |
| G06F 9/44 | (2006.01) |
| G06F 9/46 | (2006.01) |
| G05B 19/418 | (2006.01) |
| G01R 31/08 | (2006.01) |
| G08C 15/00 | (2006.01) |

(52) U.S. Cl. ............... 705/7; 714/16; 705/8; 705/9; 370/245
(58) Field of Classification Search .............. 714/16; 705/7–9; 370/245
See application file for complete search history.

(56) References Cited

U.S. PATENT DOCUMENTS

| | | | |
|---|---|---|---|
| 4,697,266 A | 9/1987 | Finley | |
| 4,920,483 A | 4/1990 | Pogue et al. | |
| 5,287,537 A | 2/1994 | Newmark et al. | |
| 5,301,320 A | 4/1994 | McAtee et al. | |

(Continued)

FOREIGN PATENT DOCUMENTS

| | | |
|---|---|---|
| EP | 0697652 A1 | 2/1996 |
| EP | 0953929 A2 | 11/1999 |
| EP | 1238688 A | 9/2002 |
| JP | 2006215713 A | 8/2006 |
| WO | 0054202 A | 9/2000 |
| WO | 2005033933 A1 | 4/2005 |

OTHER PUBLICATIONS

Brambilla, "Exception Handling in workflow-driven web applications", May 2005, ACM 1-59593-036-09/05/0005, pp. 170-179.*

(Continued)

*Primary Examiner*—Robert Beausoliel
*Assistant Examiner*—Jeison C Arcos
(74) *Attorney, Agent, or Firm*—Senniger Powers LLP

(57) ABSTRACT

Asynchronous fault handling for a workflow. A state automaton for an activity in the workflow is defined. The state automaton includes at least an executing state, a faulting state, and a closed state and classifies an execution lifetime of the activity. The activity is defined to include work items and includes an execution hierarchy for the work items. Each work item includes an operation for executing a portion of the activity. Each work item is transitioned to the executing state. The included operation of transitioned work items is executed in the executing state. One or more of the transitioned work items are identified in response to the faulting event as a function of the execution hierarchy and the included operation. The faulting event is asynchronously handled by transitioning the one or more identified work items to the faulting state while executing the included operation of the remaining transitioned work items.

20 Claims, 13 Drawing Sheets

U.S. PATENT DOCUMENTS

| | | | |
|---|---|---|---|
| 5,634,127 | A | 5/1997 | Cloud et al. |
| 5,636,204 | A * | 6/1997 | Mizuno et al. .............. 370/245 |
| 5,734,837 | A | 3/1998 | Flores et al. |
| 5,774,661 | A | 6/1998 | Chatterjee et al. |
| 5,819,022 | A * | 10/1998 | Bandat ........................ 714/16 |
| 5,923,863 | A | 7/1999 | Adler et al. |
| 5,930,512 | A | 7/1999 | Boden et al. |
| 6,016,394 | A | 1/2000 | Walker |
| 6,028,997 | A | 2/2000 | Leymann et al. |
| 6,073,109 | A | 6/2000 | Flores et al. |
| 6,078,982 | A | 6/2000 | Du et al. |
| 6,115,646 | A | 9/2000 | Fiszman et al. |
| 6,158,044 | A | 12/2000 | Tibbetts |
| 6,225,998 | B1 | 5/2001 | Okita et al. |
| 6,253,369 | B1 | 6/2001 | Cloud et al. |
| 6,397,192 | B1 | 5/2002 | Notani et al. |
| 6,405,364 | B1 | 6/2002 | Bowman-Amuah |
| 6,411,961 | B1 | 6/2002 | Chen |
| 6,412,109 | B1 | 6/2002 | Ghosh |
| 6,560,626 | B1 | 5/2003 | Hogle et al. |
| 6,567,783 | B1 | 5/2003 | Notani et al. |
| 6,604,104 | B1 | 8/2003 | Smith |
| 6,609,128 | B1 | 8/2003 | Underwood |
| 6,621,505 | B1 | 9/2003 | Beauchamp et al. |
| 6,633,878 | B1 | 10/2003 | Underwood |
| 6,662,188 | B1 | 12/2003 | Rasmussen et al. |
| 6,678,882 | B1 | 1/2004 | Hurley et al. |
| 6,708,186 | B1 | 3/2004 | Claborn et al. |
| 6,807,583 | B2 | 10/2004 | Hrischuk et al. |
| 6,845,507 | B2 | 1/2005 | Kenton |
| 6,886,094 | B1 | 4/2005 | Blandy |
| 6,889,231 | B1 | 5/2005 | Souder et al. |
| 6,898,604 | B1 | 5/2005 | Ballinger et al. |
| 6,898,790 | B1 | 5/2005 | Cheong et al. |
| 6,918,053 | B1 | 7/2005 | Thatte et al. |
| 6,928,582 | B2 | 8/2005 | Adl-Tabatabai et al. |
| 6,964,034 | B1 | 11/2005 | Snow |
| 6,971,096 | B1 | 11/2005 | Ankireddipally et al. |
| 6,985,939 | B2 | 1/2006 | Fletcher et al. |
| 7,069,536 | B2 | 6/2006 | Yaung |
| 7,096,454 | B2 | 8/2006 | Damm et al. |
| 7,100,195 | B1 | 8/2006 | Underwood |
| 7,133,833 | B1 | 11/2006 | Chone et al. |
| 7,222,334 | B2 | 5/2007 | Casati et al. |
| 7,233,952 | B1 | 6/2007 | Chen |
| 7,240,324 | B2 | 7/2007 | Casati et al. |
| 7,272,816 | B2 | 9/2007 | Schulz et al. |
| 7,490,073 | B1 | 2/2009 | Qureshi et al. |
| 2001/0013118 | A1 | 8/2001 | Krishnaswamy |
| 2002/0032692 | A1 | 3/2002 | Suzuki et al. |
| 2002/0040312 | A1 | 4/2002 | Dhar et al. |
| 2002/0065701 | A1 | 5/2002 | Kim et al. |
| 2002/0147606 | A1 | 10/2002 | Hoffmann et al. |
| 2002/0170035 | A1 | 11/2002 | Casati et al. |
| 2002/0184610 | A1 | 12/2002 | Chong et al. |
| 2002/0188644 | A1 | 12/2002 | Seidman |
| 2003/0004771 | A1 | 1/2003 | Yaung |
| 2003/0018508 | A1 * | 1/2003 | Schwanke ...................... 705/9 |
| 2003/0018643 | A1 | 1/2003 | Mi et al. |
| 2003/0033191 | A1 | 2/2003 | Davis |
| 2003/0055668 | A1 | 3/2003 | Saran et al. |
| 2003/0084016 | A1 | 5/2003 | Norgaard et al. |
| 2003/0084127 | A1 | 5/2003 | Budhiraja et al. |
| 2003/0135659 | A1 | 7/2003 | Bellotti et al. |
| 2003/0144891 | A1 * | 7/2003 | Leymann et al. .............. 705/7 |
| 2003/0177046 | A1 | 9/2003 | Socha-Leialoha |
| 2003/0200527 | A1 * | 10/2003 | Lynn et al. .................. 717/102 |
| 2003/0217053 | A1 * | 11/2003 | Bachman et al. .............. 707/4 |
| 2003/0220707 | A1 | 11/2003 | Budinger et al. |
| 2003/0233374 | A1 | 12/2003 | Spinola |
| 2004/0078105 | A1 | 4/2004 | Moon et al. |
| 2004/0078373 | A1 | 4/2004 | Ghoneimy et al. |
| 2004/0078778 | A1 | 4/2004 | Leymann et al. |
| 2004/0148213 | A1 | 7/2004 | Aziz et al. |
| 2004/0148214 | A1 | 7/2004 | Aziz et al. |
| 2004/0153350 | A1 | 8/2004 | Kim et al. |
| 2004/0162741 | A1 | 8/2004 | Flaxer et al. |
| 2004/0220910 | A1 | 11/2004 | Zang et al. |
| 2004/0221261 | A1 | 11/2004 | Blevins |
| 2004/0249846 | A1 | 12/2004 | Randall et al. |
| 2005/0027585 | A1 | 2/2005 | Wodtke et al. |
| 2005/0034098 | A1 | 2/2005 | DeSchryver et al. |
| 2005/0050311 | A1 | 3/2005 | Joseph et al. |
| 2005/0071209 | A1 | 3/2005 | Tatavu et al. |
| 2005/0071347 | A1 | 3/2005 | Chau et al. |
| 2005/0114401 | A1 | 5/2005 | Conkel |
| 2005/0132252 | A1 | 6/2005 | Fifer et al. |
| 2005/0149908 | A1 | 7/2005 | Klianev |
| 2005/0182773 | A1 | 8/2005 | Feinsmith |
| 2005/0193286 | A1 | 9/2005 | Thatte et al. |
| 2005/0204333 | A1 | 9/2005 | Denby et al. |
| 2005/0216482 | A1 | 9/2005 | Ponessa |
| 2005/0246692 | A1 | 11/2005 | Poteryakhin et al. |
| 2006/0053120 | A1 | 3/2006 | Shum et al. |
| 2006/0059253 | A1 | 3/2006 | Goodman et al. |
| 2006/0064335 | A1 | 3/2006 | Goldszmidt et al. |
| 2006/0074734 | A1 | 4/2006 | Shukla et al. |
| 2006/0074735 | A1 | 4/2006 | Shukla et al. |
| 2006/0074736 | A1 | 4/2006 | Shukla et al. |
| 2006/0112122 | A1 | 5/2006 | Goldszmidt et al. |
| 2006/0143193 | A1 | 6/2006 | Thakkar et al. |
| 2006/0206863 | A1 | 9/2006 | Shenfield et al. |
| 2006/0271927 | A1 | 11/2006 | Morales et al. |
| 2007/0239498 | A1 * | 10/2007 | Shukla et al. .................. 705/7 |
| 2007/0239499 | A1 * | 10/2007 | Shukla et al. .................. 705/7 |
| 2007/0239505 | A1 * | 10/2007 | Shukla et al. .................. 705/8 |
| 2008/0320486 | A1 | 12/2008 | Bose et al. |
| 2009/0013089 | A1 | 1/2009 | Sullivan et al. |

OTHER PUBLICATIONS

Maurer, Frank et al., Merging Project Planning and Web-Enabled Dynamic Workflow Technologies, IEEE Internet Computing, Jun. 2000, pp. 65-74, XP002345613, ISSN: 1089-7801, IEEE Service Center, Piscataway, NJ, US.

Abhay Parasnis, Session Code: DAT321—Datay Systems—BizTalk Orchestration Engine Futures, Microsoft Professional Developers Conference 2003, Online!, Oct. 27, 2003-Oct. 30, 2003, pp. 1-26, XP002360567, Los Angles, CA, USA http://only4gurus.com/v3/downloadcount.asp?id=421>, retrieved on Dec. 21, 2005.

Marshak R T, IBM's Flowmark Object-Oriented Workflow for Mission-Critical Applications, Workgroup Computing Report, May 1, 1994, pp. 3-13, vol. 17, No. 5, XP00056899, ISSN: 1057-8889.

Farahbod, Roozbeh et al., "A Formal Semantics for the Business Process Execution Language for Web Services", http://www.cs.sfu.ca/˜se/publications/WSMAI-2005.pdf, May 2005, 12 pages, Simon Fraser University, Burnaby, B.C. Canada.

Ross, Robert et al., "AF-APL—Bridging Principles & Practice in Agent Oriented Languages", http://www.informatik.uni-bremen.de/~robertr/ross-promas-04.pdf, 2004, 13 Pages, UK.

Author Unknown, Windows Workflow Foundation Web: The Official Microsoft Windows Workflow Site, WinFX Windows Workflow Foundation, http://www.windowsworkflow.net/default.aspx?tab-index=0&tabid=1, printed Mar. 1, 2006, 4 pages, Microsoft Corporation, USA.

Miller, Robert et al., "Primitives and Mechanisms of the Guardian Model for Exception Handling in Distributed Systems", ECOOP Workshop, Jul. 21, 2003, 40 pages, Germany.

Goff et al., "Object Serialization and Decimalization using XML," Apr. 2001, CERN, Switzerland, pp. 1-14.

ISO/IEC, "Document Schema Definition Languages (DSDL)—Part 4: Namespace-based Validation Dispatching Language—NVDL, " May 2004, available at http://dsdl.org, pp. i-vi, 1-45.

Brambilla, Marco, "Exception Handling within Workflow-based Web Applications," 2004, 14 pages.

Hagen, Claus et al., "Exception Handling in Workflow Management Systems," IEEE Transactions on Software Engineering, Oct. 2000, 16 pages, vol. 26, No. 10.

Perkins, Alan, "Business Rules=Meta-Data," In: Proceedings of the Technology of Object-Oriented Languages and Systems, 2000, pp. 285-294.

Notification of Transmittal of The International Search Report and the Written Opinion of the International Searching Authority in International Application No. PCT/US2007/004642, dated Aug. 3, 2007, 7 pages.

Tan et al., "Extending the Message Flow Debugger for MQSI," Nov. 2001, IBM Press, pp. 1-12.

Blake, "Coordinating Multiple Agents for Workflow-oriented Process Orchestration," Springer-Verlag, 2003, pp. 387-404.

Anonymous, "Open Source Workflow Engines in Java," available at http://web.archive.org/web/20051214041940/http://java-source.net/open-source/workflow-engines>, Dec. 14, 2005, 6 pages.

Wikipedia, "Saved Game," available at http://en.wikipedia.org/w/index.php?title=Saved_game&oldid=42574026>, Mar. 7, 2006, 4 pages.

Box, D., et al., "Simplify Development With The Declarative Model Of Windows Workflow Foundation", MSDN Magazine, [Online], Jan. 2006, pp. 1-10, XP-002524524, retrieved from the Internet: URL:http://msdn.microsoft.com/en-us/magazine/cc163661.aspx>.

Taulty, M., "WF: Exceptions", Internet Article, [Online], Mar. 13, 2006, XP-002524741, retrieved from the Internet: URL:http://download.microsoft.com/download/c/1/9/c19a65d7-6c83-47c3-9969-7b038baf04c5/WF_Exceptions.zip>.

Taulty, M., "Mike Taulty's Blog—Windows Workflow Foundation Videos", Internet Article, [Online], Mar. 31, 2006, pp. 1-5, XP-002524526, retrieved from the Internet: URL:http://mtaulty.com/communityserver/blogs/mike_taultys_blog/archive/2006/03/31/5806.aspx>.

Anonymous, "Screencasts by Mike Taulty", Internet Article, [Online], Apr. 21, 2009, pp. 1-8, XP-002524527, retrieved from the Internet: URL:http://www.microsoft.com/uk/msdn/screencasts/presenter/11/mike-taulty.aspx?

Taulty, M., "WF: Cancel Handlers", Internet Article, [Online], Mar. 21, 2006, XP-002524525, retrieved from the Internet: URL:http://download.microsoft.com/download/b/b/e/bbe7bc51-bb78-4510-9540-46e46929129d/WF_Cancellation.zip>.

Kuczun et al., "Network Design: Tasks & Tools", in proceedings of the conference on Designing interactive systems, 1997, pp. 215-222.

Kumar et al., "Dynamic Routing and Operational Controls in Workflow Management Systems", Management Science, vol. 45, No. 2, Feb. 1999, pp. 253-272. Retrieved Sep. 25, 2009, from ABI/INFORM Global.

\* cited by examiner

FIG. 7D
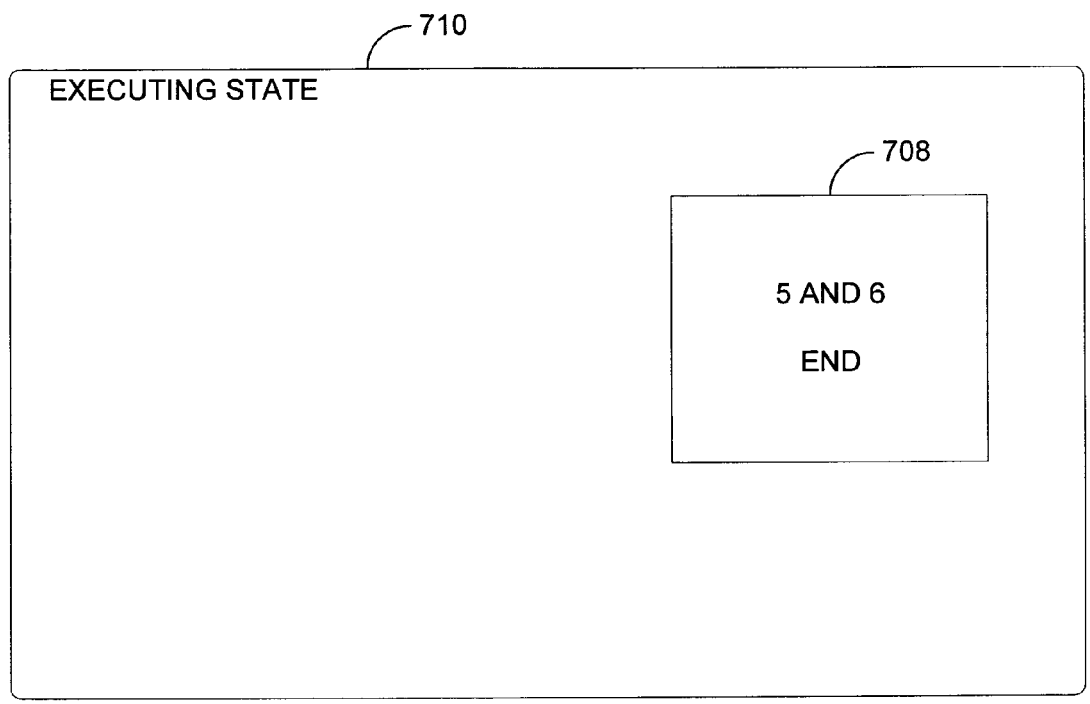
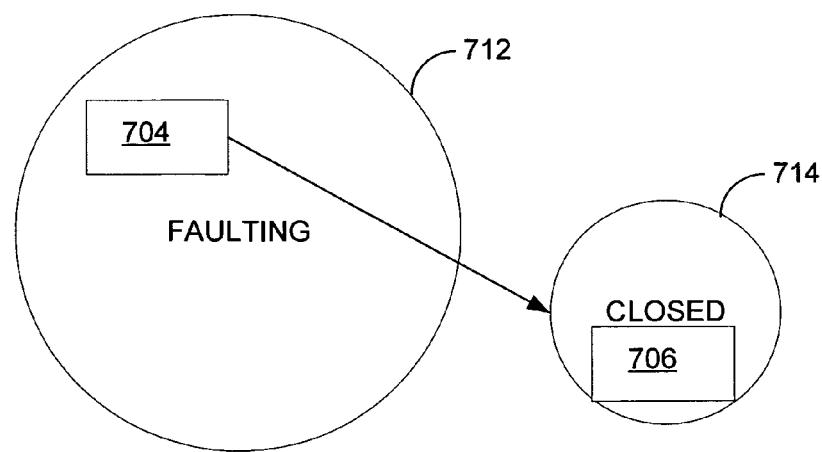

ASYNCHRONOUS FAULT HANDLING IN PROCESS-CENTRIC PROGRAMS

BACKGROUND

Process-oriented or process-centric programs have evolved to enable processing of complex instructions modeling real-world events. Process-centric programs mirror real-world processes and mirror interactions between real-world entities. Existing systems attempt to map business problems to high-level workflows by modeling the business problem. However, real world workflows vary in a variety of dimensions such as (a) execution and modeling complexity, (b) knowledge of the structure of the flow at design time, (c) statically defined or ad-hoc/dynamic, (d) ease of authoring and editing the flow at various points in its lifecycle, and (e) weak or strong association of business logic with the core workflow process. Existing models fail to accommodate all these factors.

Further, most existing workflow models are based on either language-based approaches (e.g., BPEL4WS, XLANG/S, and WSFL) or application based approaches. Language based approaches are high-level workflow languages with a closed set of pre-defined constructs which help model the workflow process to the user/programmer. The workflow languages carry all of the semantic information for the closed set of constructs to enable the user to build a workflow model. However, the languages are not extensible by the developers and represent a closed set of primitives that constitute the workflow model. The languages are tied to the language compiler shipped by the workflow system vendor. Only the workflow system product vendor may extend the model by extending the language with a new set of constructs in a future version of the product. This often requires upgrading the compiler associated with the language. In addition, the languages usually do not declaratively expose or define functions or operations that can be readily and efficiently used by other programs.

Application based approaches are applications which have the workflow capabilities within the application to solve a domain specific problem. These applications are not truly extensible nor do they have a programmable model.

In addition, with the existing approaches, the issues of complexity, foreknowledge, dynamic workflows, authoring ease, and strength of associations with business logic and core workflows are not adequately addressed. There are no extensible, customizable, and re-hostable workflow designer frameworks available to build visual workflow designers to model different classes of workflows. Existing systems lack a rapid application development (RAD) style workflow design experience which allows users to graphically design the workflow process and associate the business logic in a programming language of developer's choice.

Also, workflow processes deal with cross cutting orthogonal and tangled concerns that span multiple steps of a workflow process model. For example, while parts of the workflow process are designed to participate in long running transactions, other parts of the same process are designed for concurrent execution or for accessing a shared resource. Due to design shortcomings, existing systems fail to provide interleaving of execution threads which enable users to design synchronous or interleaved execution of activities. Still other portions of the same workflow process require tracking, while other portions handle business or application level exceptions. There is a need to apply certain behaviors to one or more portions of a workflow process.

Some workflow modeling approaches are impractical as they require a complete flow-based description of an entire business process including all exceptions and human interventions. Some of these approaches provide additional functionality as exceptions arise, while other approaches exclusively employ a constraint-based approach instead of a flow-based approach to modeling a business process. Existing systems implement either the flow-based or constraint-based approach. Such systems are too inflexible to model many common business situations. These systems also lack the capability to asynchronously handle exceptions or cancellations.

SUMMARY

Embodiments of the invention enable asynchronous fault or exception handling by having a faulting state in a state automaton defining execution lifetime of an activity in the workflow. By having the faulting state, aspects of the invention enable developers or programs to declaratively design programs for exception or fault handling such that portions of the program or the activity may be in fault handling in the faulting state while other portions of the program or the activity may be unaffected by the exception or the faulting event.

Alternative embodiments of the invention enable propagation or transmission of a notification of fault handling. In yet another alternative embodiment, such propagation or transmission of the notification may be suppressed or inhibited. In addition, a further alternative embodiment responds to input from a user for handling post-faulting or post-exception operations.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIGS. 7A to 7E are block diagrams illustrating an asynchronous handling of faulting events of a workflow according to an embodiment of the invention.

Figure 1:
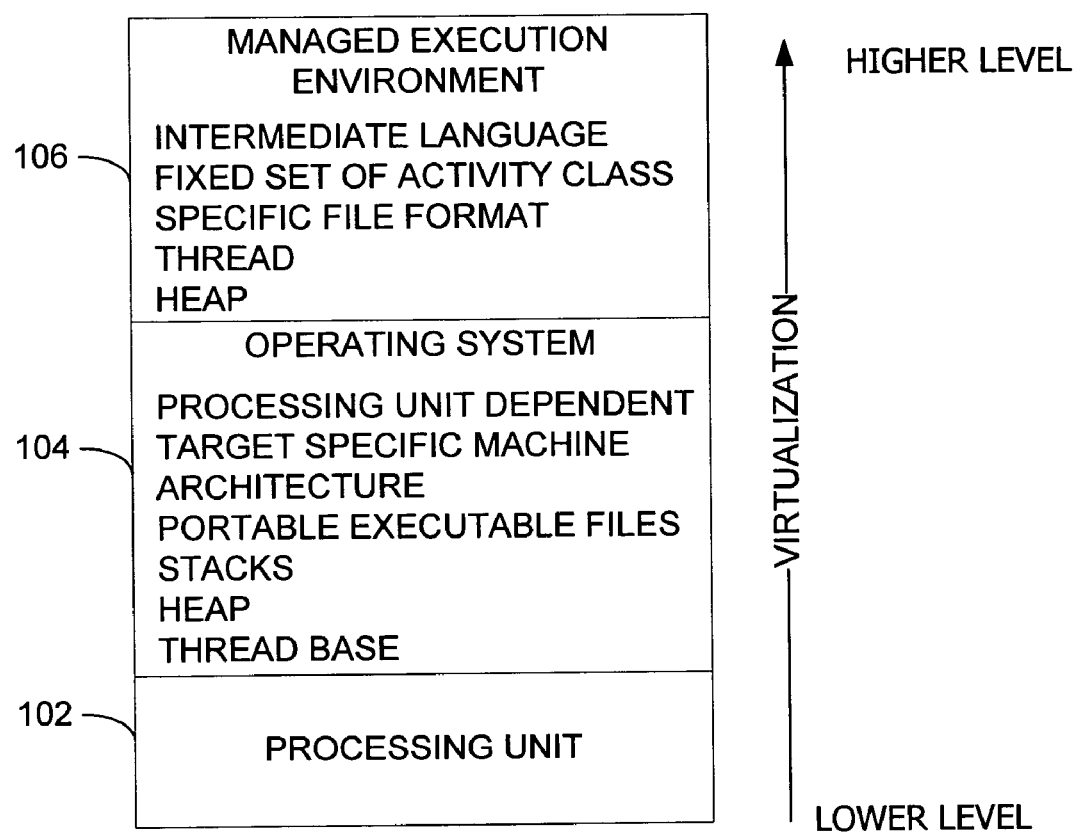
FIG. 1 is a block diagram illustrating an existing programming paradigm.

Appendix A illustrates an exemplary implementation of declaratively raising of an exception according to an embodiment of the invention.

Corresponding reference characters indicate corresponding parts throughout the drawings.

DETAILED DESCRIPTION

Referring first to FIG. 1, a block diagram illustrates an existing programming paradigm for designing programs for process-centric activities, such as a workflow. For example, the diagram shows a three-level virtualization model of existing program paradigm with a level of a managed execution environment being the highest level and a processing unit being the lowest level. In this programming design system, even at the managed execution environment level, programs, especially process-centric programs handling workflow processes, lack the ability and efficiency to accommodate complex interactions between processes in a workflow.

It is known by those skilled in the art that certain constraints are associated with designing software or application programs. In this example, in writing an operating system software program 104, the programming codes or routines are dependent on the type or configuration of processing units 102, being specific to the type of computing architecture (e.g., IBM® compatible, APPLE® computers, or other systems), or other constraints. In addition, programming languages typically need to accurately identify and utilize data structures such as stacks, heap, thread base, or other hardware-specific structures for the operating system 104 to function properly.

In dealing with complex workflow processes, existing applications use a concept of a managed execution environment 106 (e.g., a runtime environment where programs may share functions or common object-oriented classes) in which programs written in one programming language may call functions in other programs written in a different programming language. In such execution environment, these programs in different programming languages are compiled to an intermediate language such that the managed execution environment 106 may expose parameters, arguments, schemas or functions to the different programs so that the programs may interact with one another.

While this execution environment 106 creates a common communication environment between programs, the execution environment 106 includes various strict requirements that may not be suitable for handling the complexity and capability of process-centric programs. For example, the execution environment 106 requires programs be confirmed to a specific file format. The execution environment 106 also requires that functions or operations in the programs use a fixed set of functions or a class of functions defined by the execution environment 106.

Figure 2:
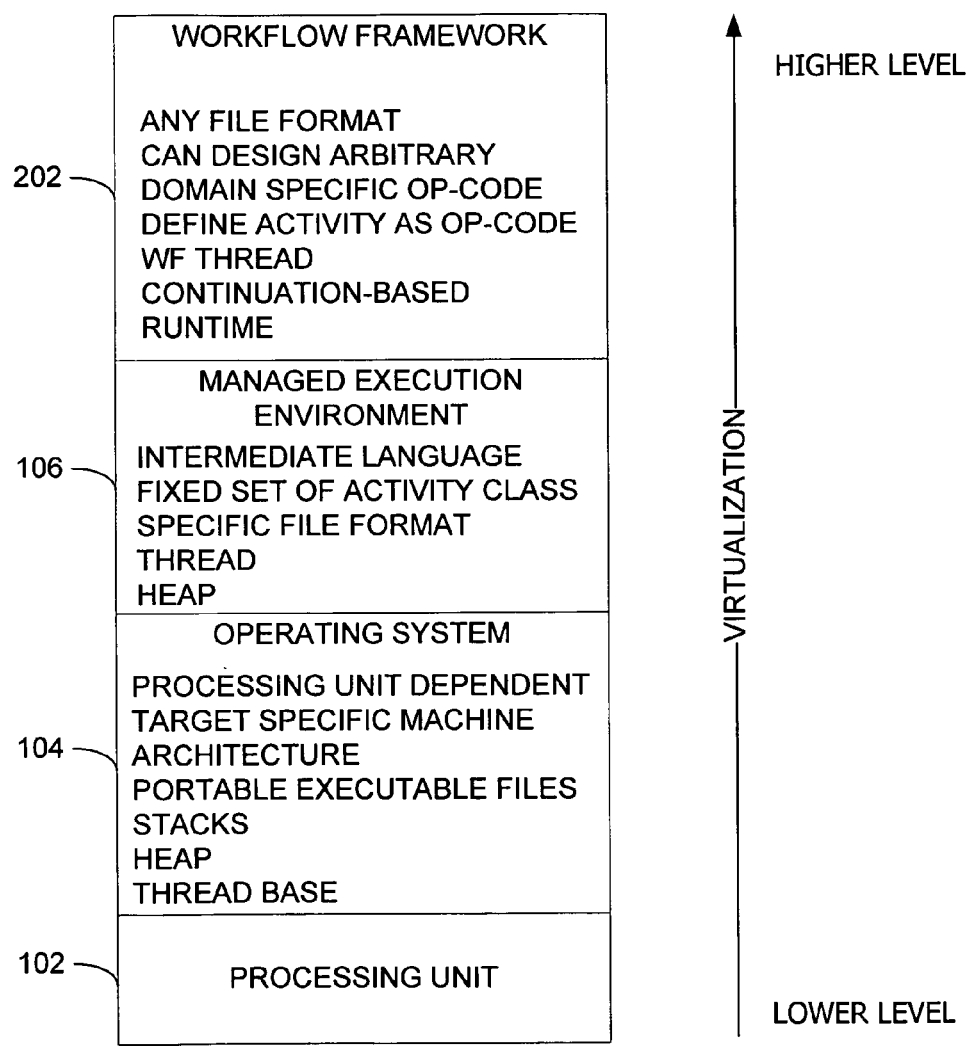
FIG. 2 is an exemplary block diagram illustrating a virtualization of a workflow design framework according to an embodiment of the invention.

Embodiments of the invention build on an extensible foundation or framework 202 in FIG. 2 to overcome the shortcomings of existing programming model. By allowing programs written in any programming language and composed in any file format, aspects of the invention enable program developers to design programs with specific functions without compromising its functionalities and specifics. By defining activities, such as workflow tasks or processes, as the base class to be executed in the workflow framework, developers can easily and efficiently build domain specific (e.g., specific execution environments such as programs in the healthcare industrial, financial industry, or the like) operation codes (hereinafter "op-code") without adhering to the rigid, hard-coded, inflexible, and the fixed set of functions or activities classes in the existing execution environment. In addition, the workflow foundation embodying aspects of the invention is a continuation based runtime layered on top of any existing framework (e.g., either a managed execution environment, operating system environment, or hardware processing unit level).

Aspects of the invention free the constraint of defining activities in a particular file format by enabling workflow designs in any fashion or representation (e.g., a flow chart, a diagram, a numbered description, or the like) as long as activities in the workflow can be constructed from the representation of the workflow designs.

In addition, the workflow framework or foundation is able to handle fault or exception raised from a lower level (e.g., OS) or exception raising functions written in other formats (e.g., intermediate language).

Figure 3:
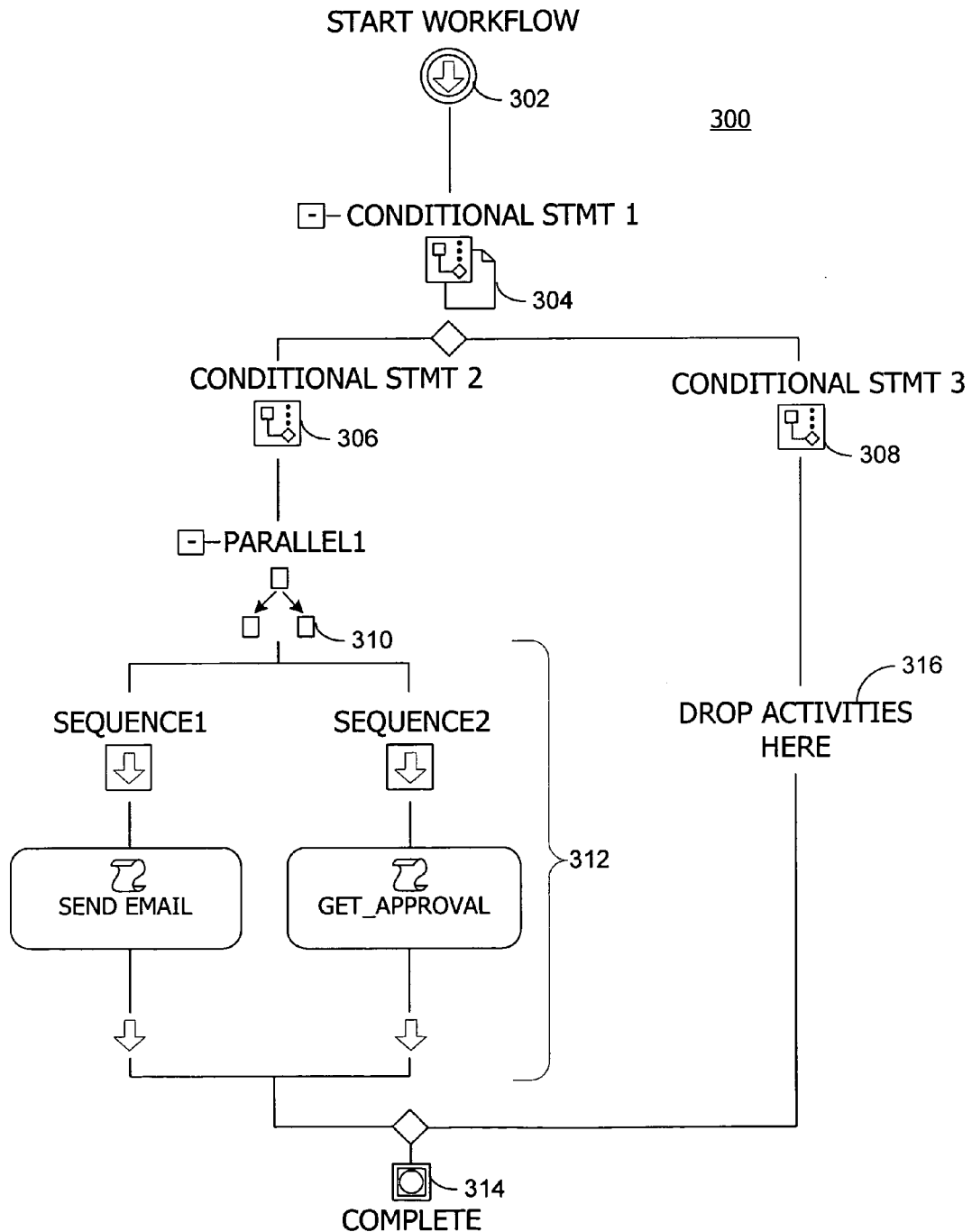
FIG. 3 is an exemplary diagram illustrating an exemplary workflow according to an embodiment of the invention.

FIG. 3 illustrates a simplistic view of a workflow 300 according to an embodiment of the invention. For example, the workflow 300 may be a workflow for processing a purchase order, and this purchase order workflow 300 may include processes or activities such as receive a purchase order, send confirmation to a customer, approve the purchase order by a manager, or the like.

The workflow 300 may start from a starting point 302. For example, the starting point 302 for a purchase-order workflow may be receiving an order from a customer. The workflow 300 may also include a conditional statement 304 (such as an "IF statement" or a "WHILE statement"), and it can be subdivided into additional conditional statements 306 and 308. The workflow 300 may also include a parallel structure 310, which further includes one or more sequences or activities 312. For example, the parallel structure 310 includes activities, such as checking the inventory and updating the available shippers, be processed in parallel. In the example shown, activities such as "Send E-mail" and "Get Approval" may be processed in parallel. At "drop activities here" 316, a user may further add or supplement more activities into the workflow 300. To complete the workflow 300, the processes or activities will conclude in a complete step or point 314.

Figure 5:
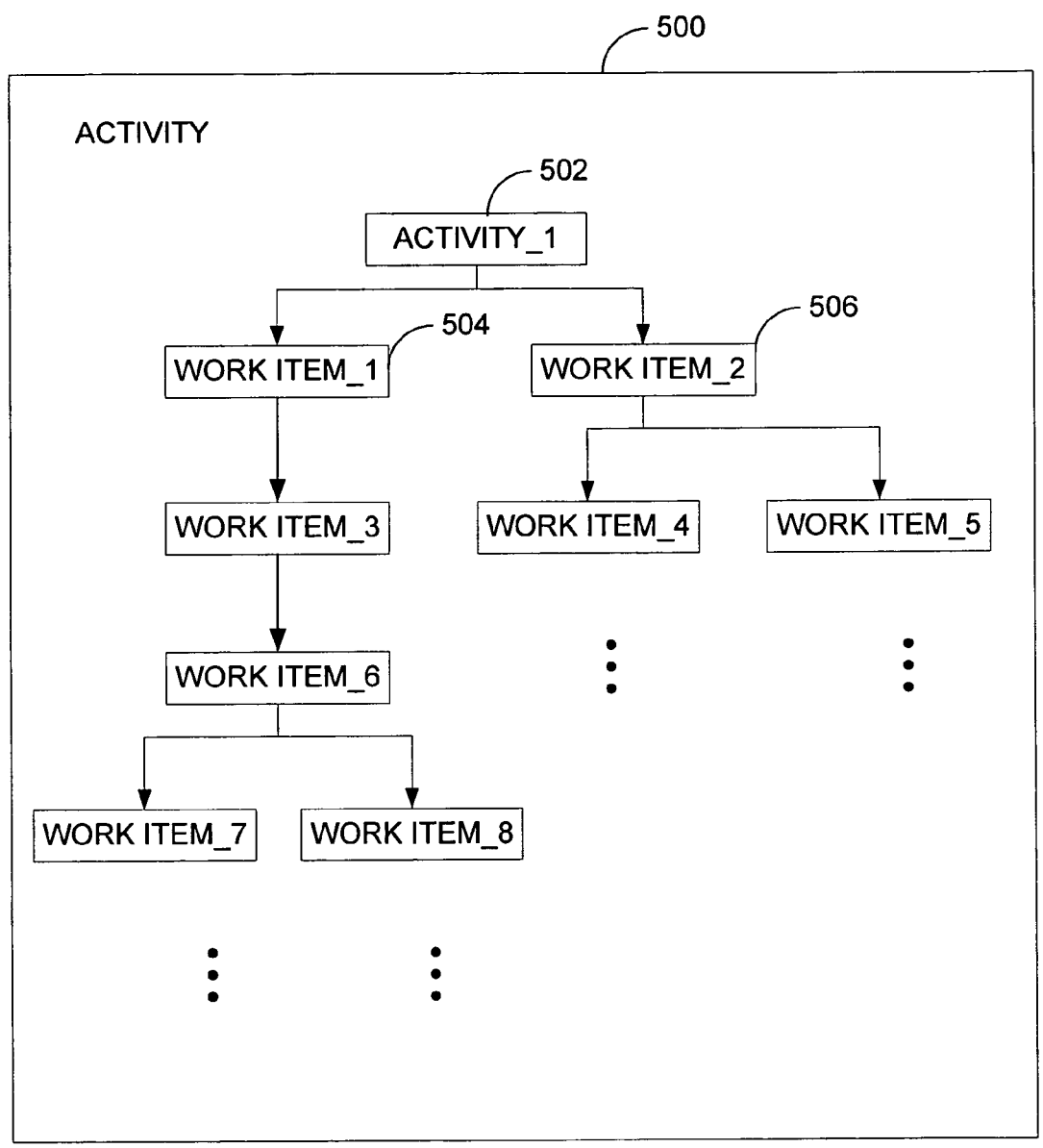
FIG. 5 is a diagram illustrating a hierarchical structure of a workflow activity according to an embodiment of the invention.

In one embodiment, the activities may be arranged hierarchically in a tree structure (see FIG. 5) 500 or other execution sequences. For example, an activity may be a composite activity in which the activity includes more than one work item associated therewith. In another embodiment, a collection of activities may be a composite activity. An activity method or operation may be in a root node 502 with two children or leaf nodes 504 and 506. The activity methods or operations in the children nodes 504 and 506 (e.g., work item_1 and work item_2, respectively) may be executed according to the hierarchical structure. In addition, the children nodes 504 and 506 may also include other children nodes having respective work items to be executed.

In another embodiment, activities include one or more of the following types: a simple activity, container activity and root activity. In this embodiment, there is one root activity in the model, and none or any quantity of simple activities or container activities inside the root activity. A container activity may include simple or container activities. The entire workflow process may be used as an activity to build higher-order workflow processes. Further, an activity may be interruptible or non-interruptible. A non-interruptible composite activity does not include interruptible activities. A non-interruptible activity lacks services that would cause the activity to block.

Moreover, in executing activities and the work items included in the activities, the workflow framework or an execution context or environment defines a scope or boundary for each of the work items. This scope or boundary includes and exposes information (e.g., in the form of data, metadata, or the like) such as the shared data or resources to be accessed by the work items, associated properties, handlers, constraints and interactions between autonomous agents. Also, each activity may be configured by a user code in any programming language. For example, the user code may represent business or application logic or rules written in a specific domain or execution environment. Each activity may support pre-interception hooks and post-interception hooks into execution in the user code. Each activity has associated runtime execution semantics and behavior (e.g., state management, transactions, event handling and exception handling). Activities may share state or resources with other activities. In addition, activities may be primitive activities or grouped into a composite activity. A primitive or basic activity has no substructure (e.g., child activities), and thus is a leaf node in a tree structure. A composite activity contains substructure (e.g., it is the parent of one or more child activities).

Figure 4:
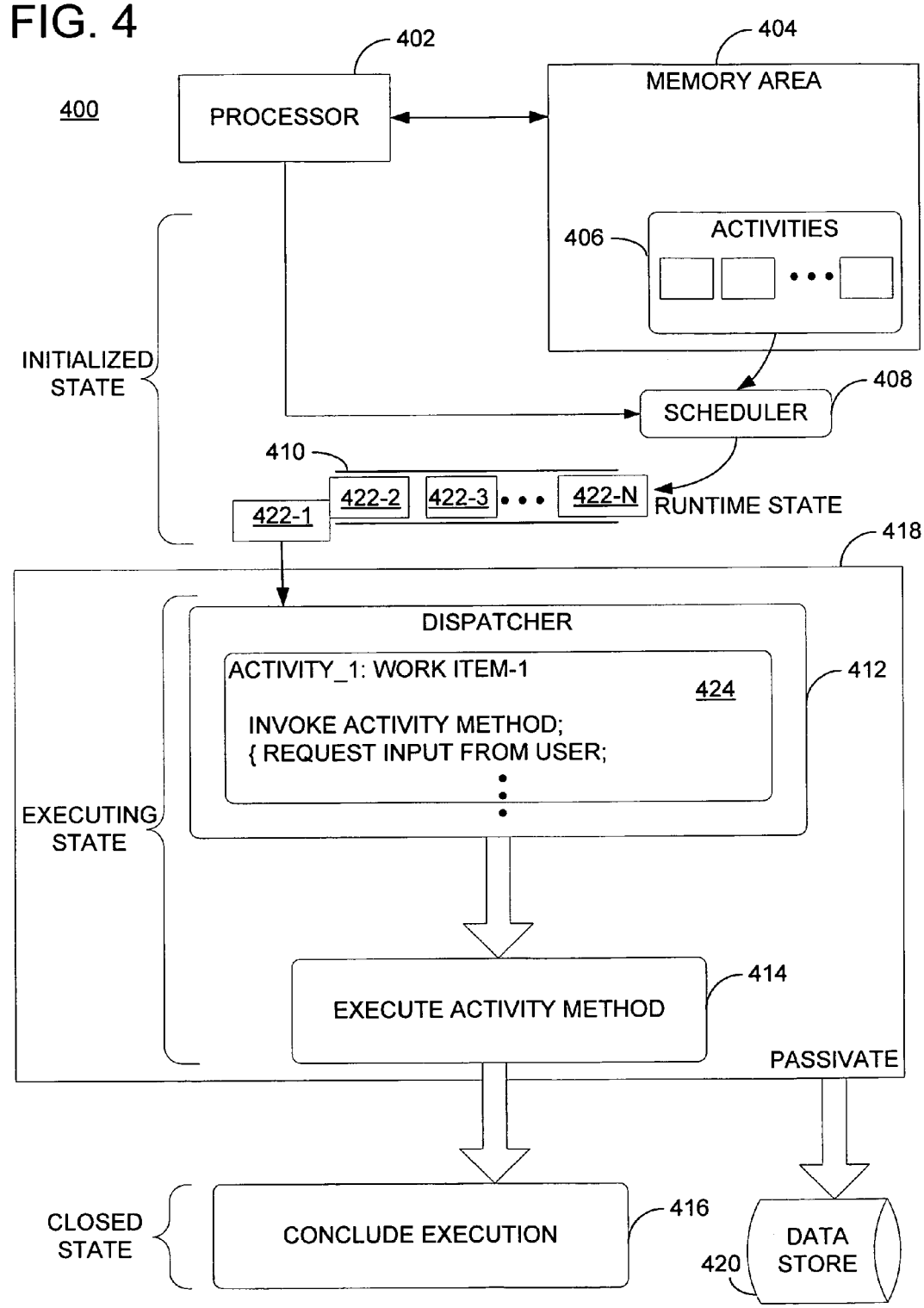
FIG. 4 is a diagram illustrating an exemplary computing environment of a system for processing workflow activities according to an embodiment of the invention.

FIG. 4 is a diagram illustrating a system 400 for processing workflow activities according to an embodiment of the invention. The system 400 includes a processor 402, which may be a processing unit or a collection of processing units. The system 400 also includes a storage or memory area 404 for storing data accessible by the processor 402. In one embodiment, the system 400 may be a computer having one or more processors or processing units (e.g., processor 402) and a system memory (e.g., memory area 404) having other components to couple various system components including the system memory to the processor 402.

In one example, the memory area 404 may include computer readable media, either volatile, nonvolatile, removable, or non-removable media, implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the system 400. The memory 404 may also include communication media embodying computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

For example, the memory area 404 stores a plurality of activities 406 for processing in a workflow (e.g., the workflow 300). Each of the plurality of activities 406 includes one or more work items, and the work items may be organized in a hierarchical structure such as a tree structure (see FIG. 5). In processing the plurality of activities 406, the processor 402 accesses or executes a scheduler 408, which is configured to set up an organized set of activities.

For example, the processor 408 accesses the work items in the plurality of activities 406 via a component or a set of computer-executable instructions such as the scheduler 408 to enqueue or to store the work items 422 to a queue 410. A dispatcher 412, accessible by the processor 402, dispatches the work items 422 for execution. For example, a work item 422-1 may include an activity method or an activity operation 424, routine, or a collection of codes for performing a function of "requesting input from a user". One or more other activity methods, activity operations, routines, or codes may be included in each of the work items 422 without departing from the scope of the invention.

Once the work items 422 are dispatched by the dispatcher 412, the processor 402 executes each of the methods 424 in the work items 422 at 414. In the example of work item 422-1, the processor 402 may provide a user via a user interface (UI) to input the requested information or data. In another embodiment, the processor 402 may connect to or access an external data source for requesting input from the user. Upon completion of the activity method or activity operation 424, the processor 402 concludes execution of the work items 422 at 416. In one embodiment, the processor 402 passivates the executing state of work items at 418 to a data store 420.

Figure 6:
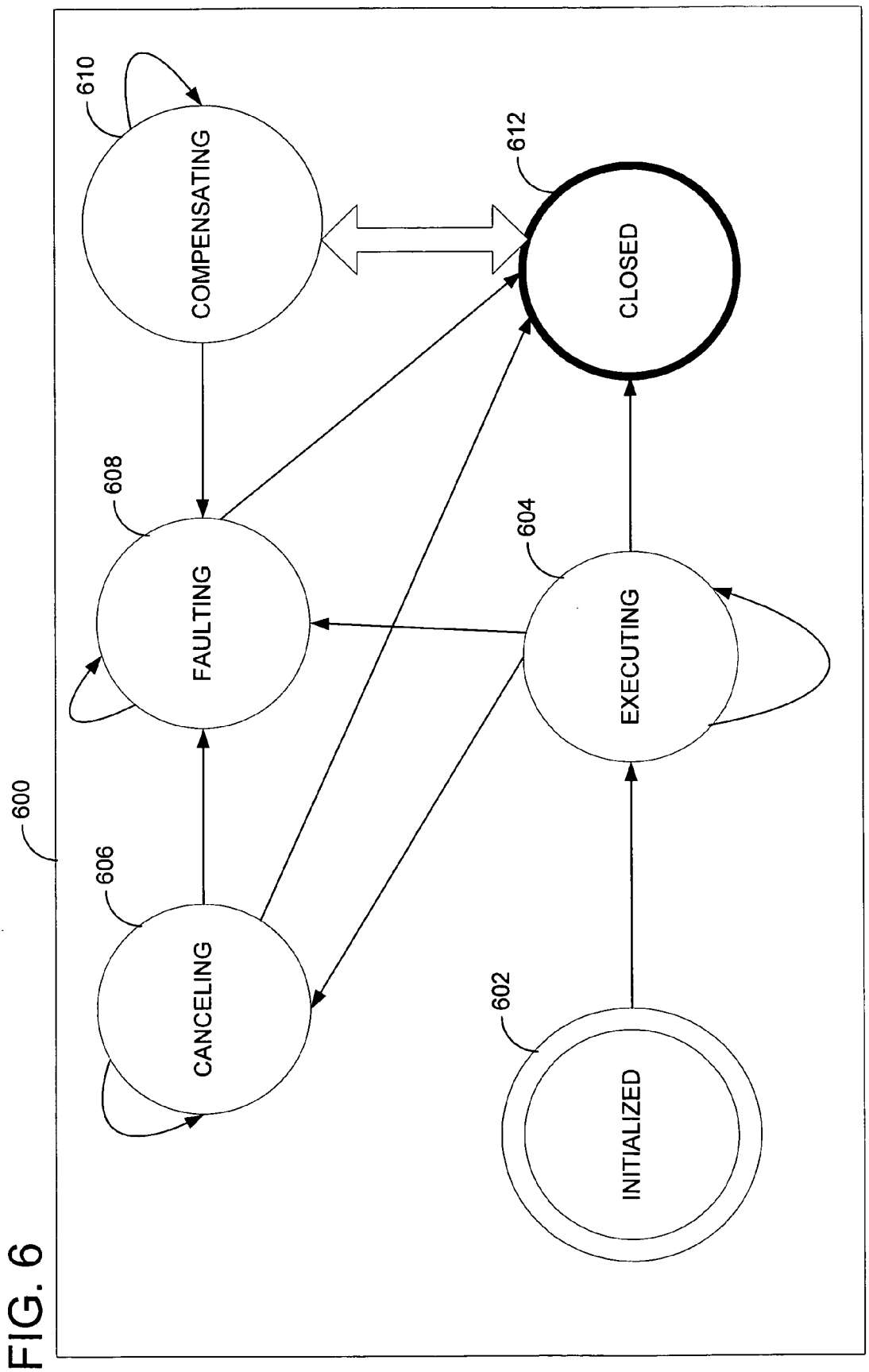
FIG. 6 is a diagram illustrating an exemplary state automaton describing execution lifetime of an activity according to an embodiment of the invention.

In another embodiment, the processor 402 executes the work items 422 according to a state automaton, such as the automaton shown in FIG. 6, which is a diagram illustrating an exemplary state automaton 600 describing processing states of work items associated with an activity according to an embodiment of the invention. In one embodiment, the state automaton 600 defines an execution lifetime of an activity. In one example, the state automaton 600 may include an initialized state, an executing state, and a closed state (as shown in FIG. 4). In another embodiment, the state automaton 600 includes an initialized state 602, an executing state 604, a canceling state 606, a faulting state 608, a compensating state 610, and a closed state 612.

For example, the state automaton 600 describes a process flow of execution of work items (e.g., work items 422) in a workflow activity. The work item 422-1, as illustrated in FIG. 4, is first initialized when it is enqueued in the queue 410. The work item 422-1 is next dequeued or removed from the queue 410 to the dispatcher 412 before being executed in the executing state (e.g., the executing state 604 in FIG. 6). Depending on the parameters or conditions during the execution of the work item 422-1, the work item 422-1 may proceed to the canceling state 606 (e.g., the canceling state 426 in FIG. 4) or the faulting state 608. In one embodiment, the work item 422-1 may proceed from the canceling state 606 to the faulting state 608. In an alternative embodiment, the compensating state 610 describes a set of operations or functions to be performed when faulting or exception has occurred.

For example, suppose an exception occurs during the execution of a work item (e.g., work item 422-1), such as a parameter for a function is missing. The system 400 transitions the work item 422-1 to the faulting state 608. In doing so, the system 400 also performs garbage collection (e.g., removing previously executed portion of the operations from cache or memory, reset parameter values, or the like) operations in the compensating state 610 before transitioning the work item 422-1 to the closed state 612. For example, work items in the compensating state 610 may trigger operations such as recovering data that was previously used for executing other work items. The closed state 612 indicates that the execution of the activity (e.g., activity 500 in FIG. 5) has completed.

In one embodiment, the state automaton 600 establishes relationship between work items in a composite activity. For example, one of the relationship rules may include that, before transitioning to the closed state 612 methods or work items in the root node of the activity tree, all of the work items in the children nodes should be in the initialized state 602 or the closed state 612. Another rule may require that, in order to transition the work items in the children node of the activity tree to the executing state 604, the work item in the root node must already be in the executing state 604.

In another embodiment, one or more additional states may be defined in the state automaton 600 without departing from the scope of embodiments of the invention.

Figure 7A:
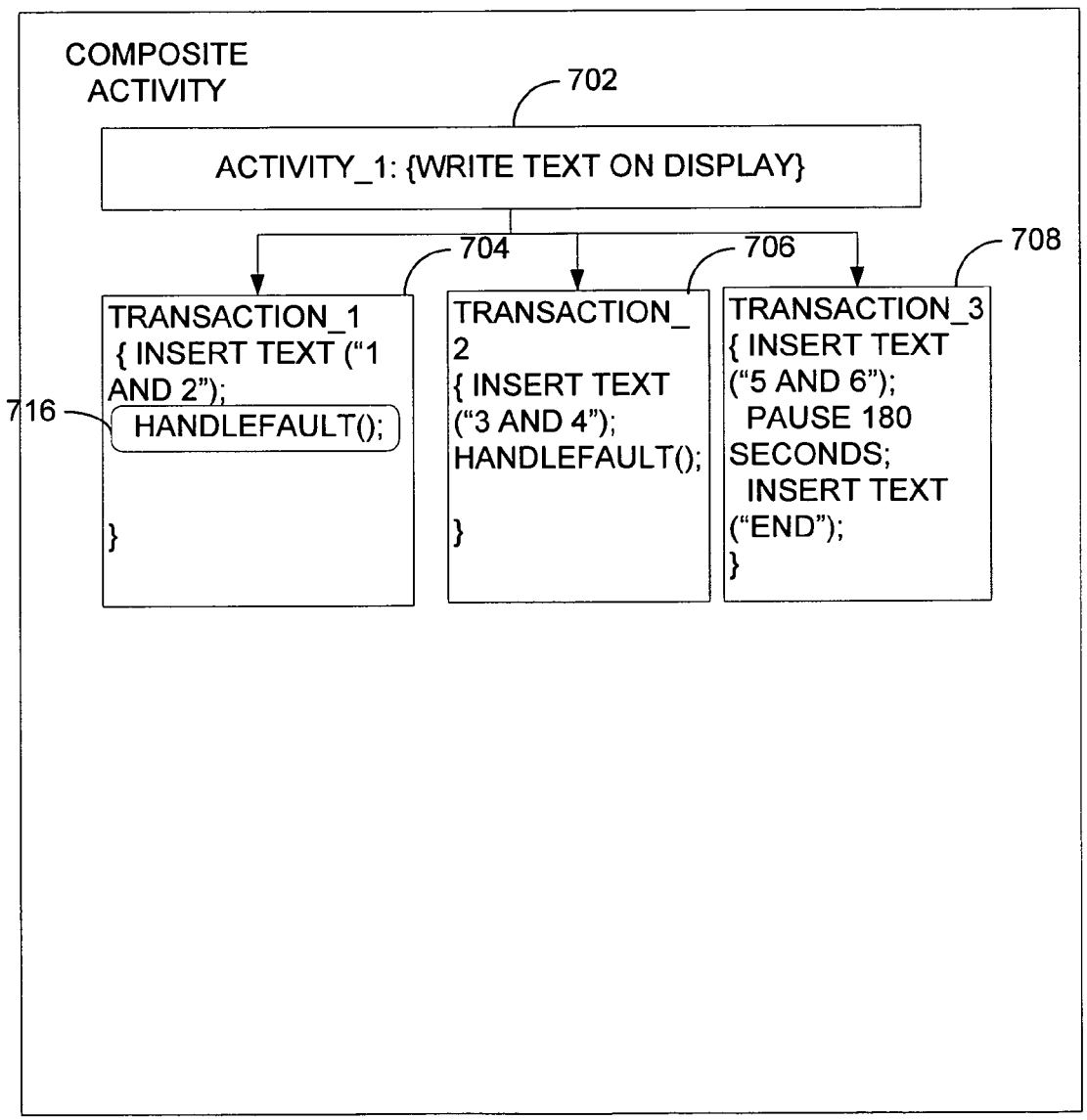
Figure 7B:
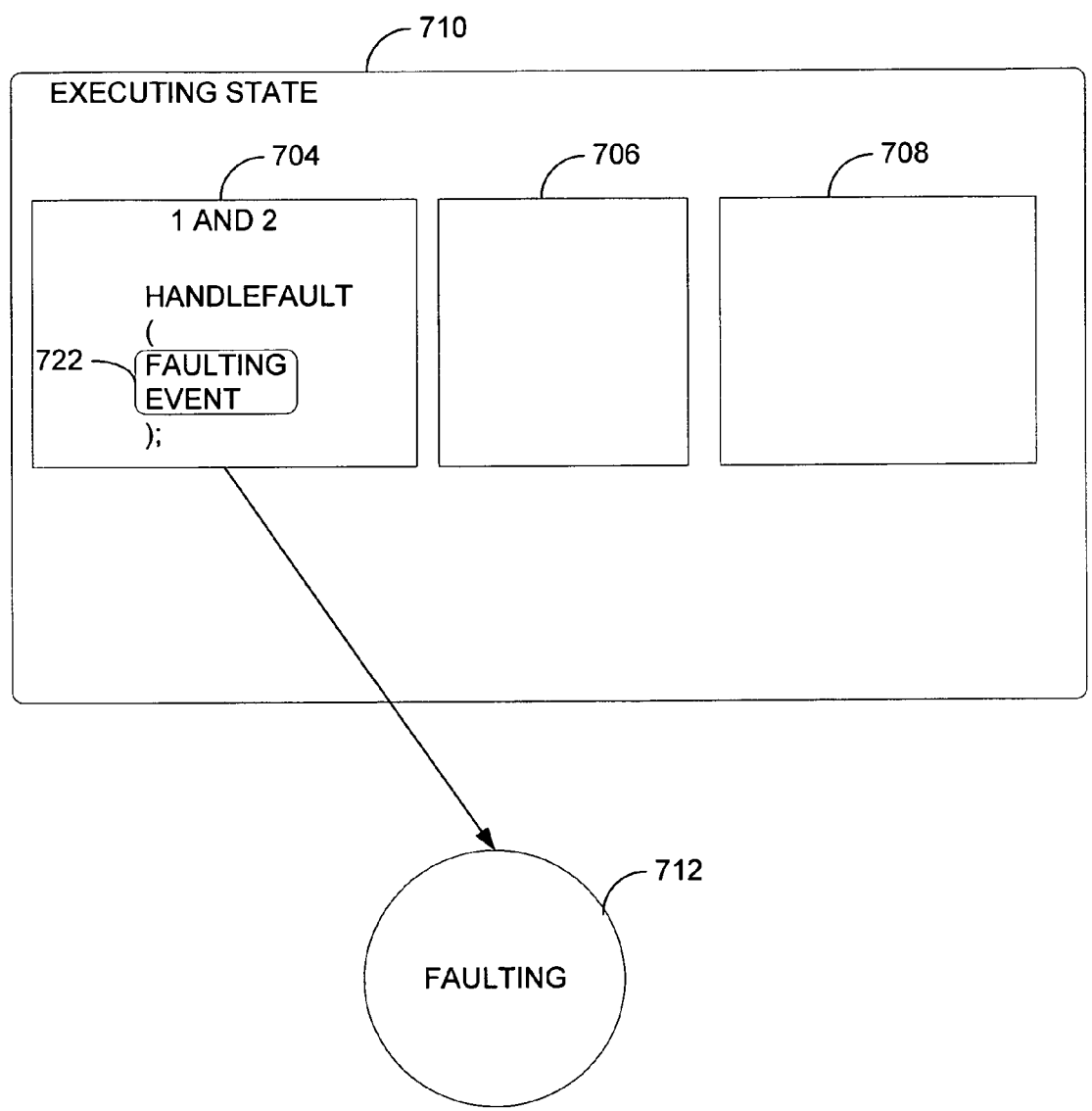
Figure 7C:
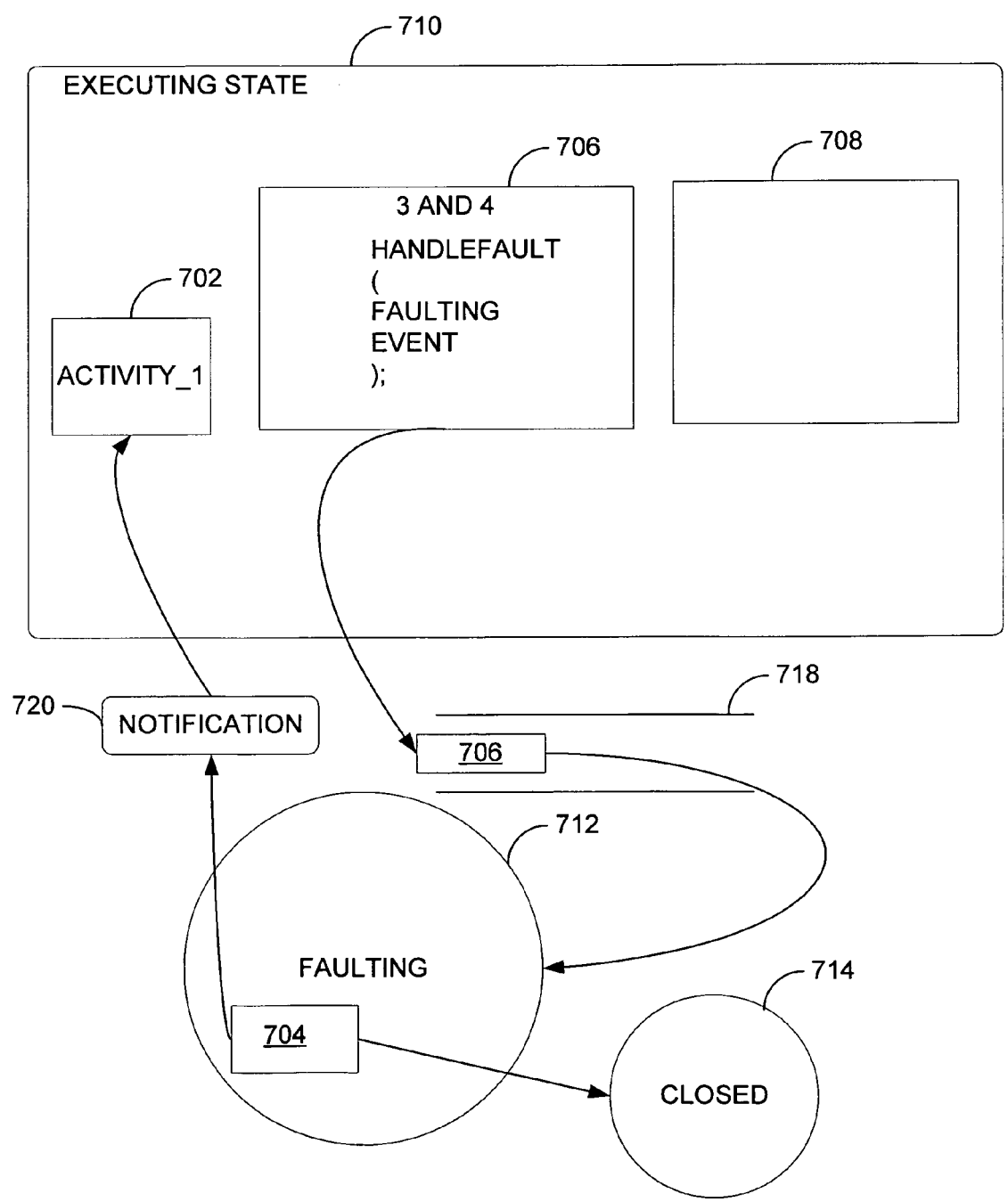
Figure 7E:
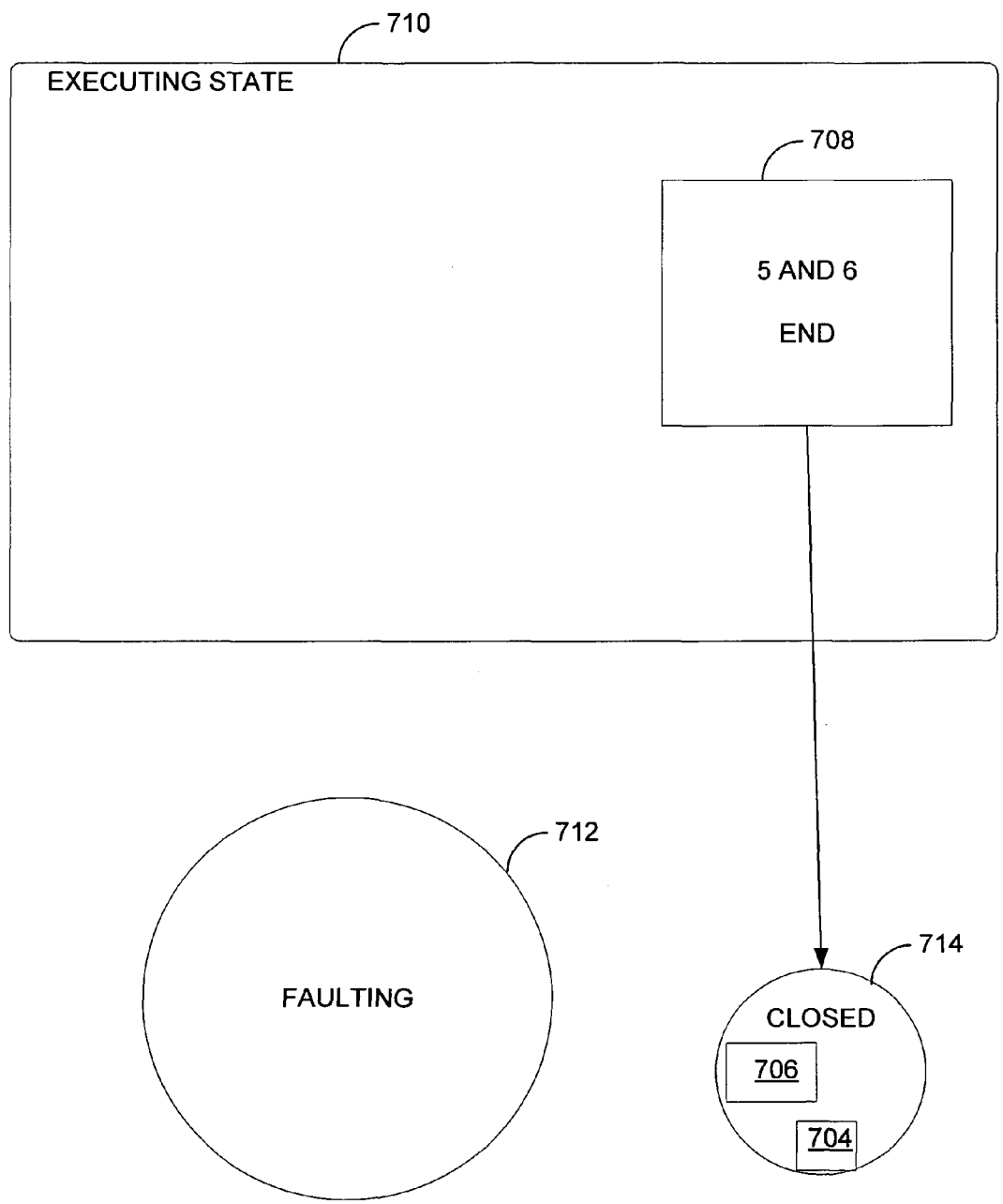

Referring next to FIGS. 7A and 7E, block diagrams illustrate asynchronous handling of faulting events in a workflow according to an embodiment of the invention. For simplistic purposes only and without limitations, FIG. 7A shows a composite activity 702 which includes three children work items organized in a tree structure: transaction_1 704, transaction_2 706, and transaction_3 708. As illustrated, the root activity 702 includes a method to "write text on display." Activity methods or operations for the work items above also include the following:

```
transaction_1 704:
{ INSERT TEXT ("1 AND 2");
  HANDLEFAULT( );
}
transaction_2 706:
{ INSERT TEXT ("3 AND 4");
  HANDLEFAULT( );
}
transaction_3 708:
{ INSERT TEXT("5 AND 6");
  PAUSE 180 SECONDS;
  INSERT TEXT ("END");
}
```

In FIG. 7B, the transaction_1 704, the transaction_2 706, and the transaction_3 708 are transitioned to the executing state 710. As illustrated, the transaction_1 704 executes the included operations by inserting texts ("1 and 2") on the display (e.g., a user interface 428) to a user 430.

While in the executing state 710, a faulting event 722 or an exception has occurred. The faulting event 722 may include a warning notification for missing data, an execution fault, an inaccurate access to a data store, or the like. In this example, the transaction_1 704 includes a handleFault( ) function 716 for handling the faulting event 722. In one embodiment, the handleFault function 716 resembles a "catch" function for fault handling in other execution environments, such as an operating system or a managed execution environment. As such, the fault propagation or dispatch to the handleFault function 716 or the "catch" handler is asynchronous.

Upon the occurrence of the faulting event 722, the transaction_1 704 transitions to a faulting state 712, and the transaction_1 704 is transitioned to a closed state 714. In one embodiment, in responding to the faulting event 722, the handleFault( ) function 716 is called and is placed in a queue (not shown) for processing.

With this well-defined protocol for exception propagation and handling, alternative embodiments may handle multiple exceptions, and multiple exceptions may be scheduled while the propagation of exceptions may be interleaved with the normal program execution.

In FIG. 7C, the transaction_2 706 and the transaction 708 are in the executing state 710. Similar to executing the transaction_1 704, the transaction_2 706 executes the included operations. In this example, the texts ("3 and 4") are inserted on the display. In addition, the transaction_2 706 also includes a similar handleFault( ) function as the handleFault( ) function 716 in the transaction_1 704 for handling the faulting event 722.

In an alternative embodiment, the handleFault( ) function 716 may propagate or transmit a notification 720 to the remaining work items in the executing state 710 as a function of the execution hierarchy or the execution hierarchical structure of the activity. For example, while the transaction_1 704 is in faulting state 712, the handleFault( ) function 716 may propagate the notification 720 (e.g., a "throw" function) so that the handleFault( ) function of the parent Activity_1 702 may handle it as if the notification 720 is a faulting event or an exception. In one embodiment, a child activity may limit the target of the throw function to its parent in the activity tree. In another embodiment, exception handling may be highly associated with or tied to the tree like structure of activities.

By establishing the faulting state 712 for handling faulting events, embodiments of the invention enable asynchronous faulting handling or exception handling, and the remaining work items or activities in the executing state 710 continue to be executed. In addition, another alternative embodiment enables scheduling of handling faulting events. For example, upon responding to the notification 720, the transaction_2 706 may be placed in a scheduler queue 718 before being transitioned to the faulting state 712. In another embodiment, the notification 720 may be suppressed such that other work items or activities in the executing state 710 continue to be executed. In one embodiment, the transaction_1 704 transitions to a closed state 714 after propagating or transmitting the notification 720. In yet another embodiment, fault propagation and handling survive and span across passivation cycles.

In FIG. 7D, the transaction_3 708 is being executed in the executing state 710. For example, the included operations of the transaction_3 708 insert the texts ("5 and 6") and pause 180 seconds before inserting the text ("END") on the display. The included operations, however, do not include functions for faulting handling. As such, upon completion of the included operations, the transaction_3 708 is transitioned to the closed state 714 in FIG. 7E. In addition, the transaction_2 706 also transitions to the closed state 714 after being dequeued from the scheduler queue 718 to the faulting state 712.

Without limitations, Appendix A illustrates an exemplary implementation of declaratively raising of an exception according to an embodiment of the invention. In one embodiment, programmers or developers may design a fault handler for handling a particular type of faulting events or exceptions. In yet another embodiment, work items or activities in the workflow may not include a function or incapable to handle faulting events. In this embodiment, the workflow execution environment handles the faulting events. In yet another embodiment, one or more post-fault-handling operations may be provided to the user via the UI 428 to the user 430 in FIG. 4.

While FIGS. 7A to 7E illustrate snapshots of the executing state or parts of the state automaton sequentially (e.g., transactions are executed sequentially), work items in the executing state may be processed simultaneously or substantially simultaneously without departing from the scope of the invention.

Figure 8:
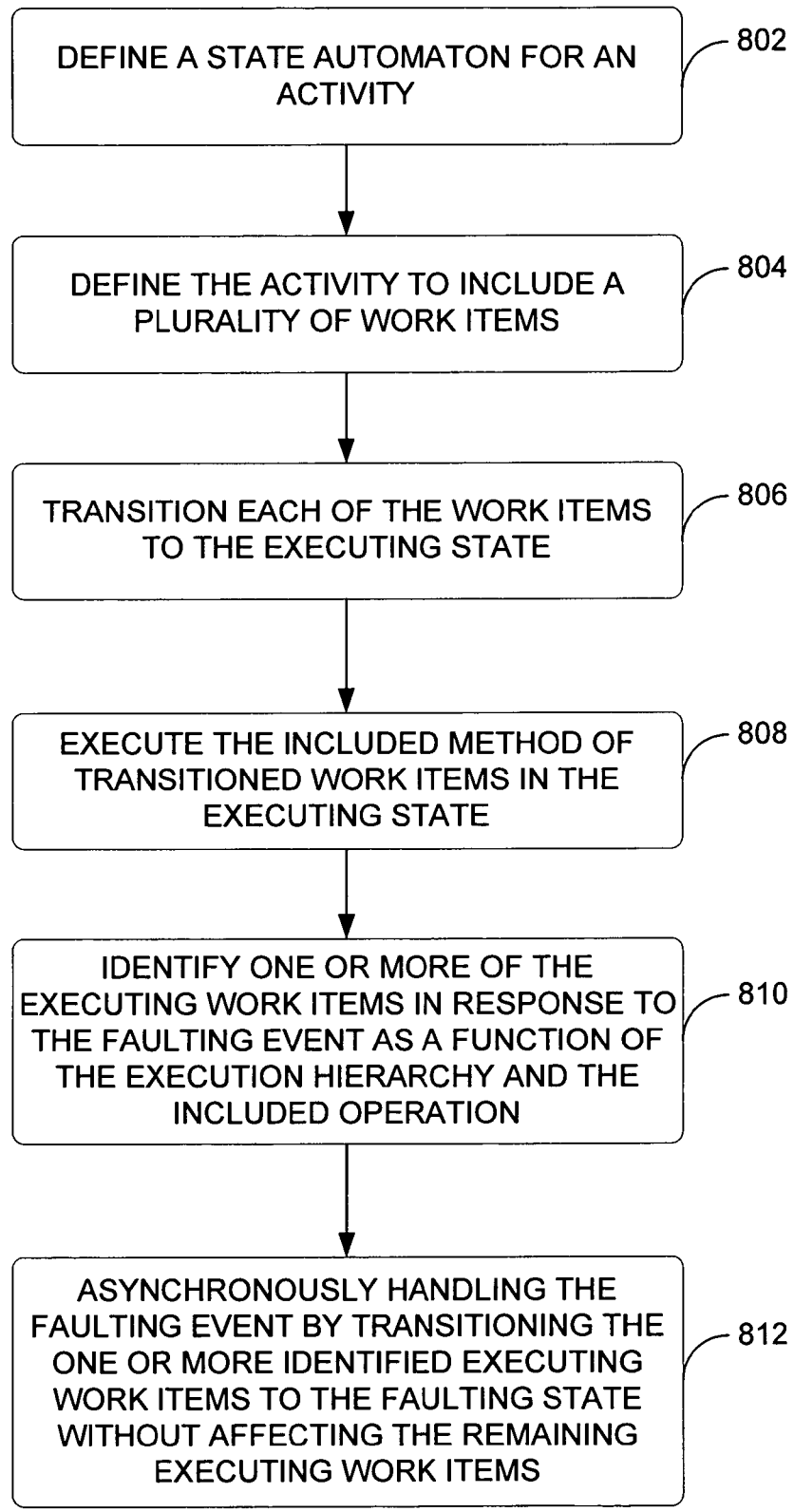
FIG. 8 is a flow diagram illustrating a method for asynchronously handling of a faulting event for an activity of a workflow according to an embodiment of the invention.
Figure 9:
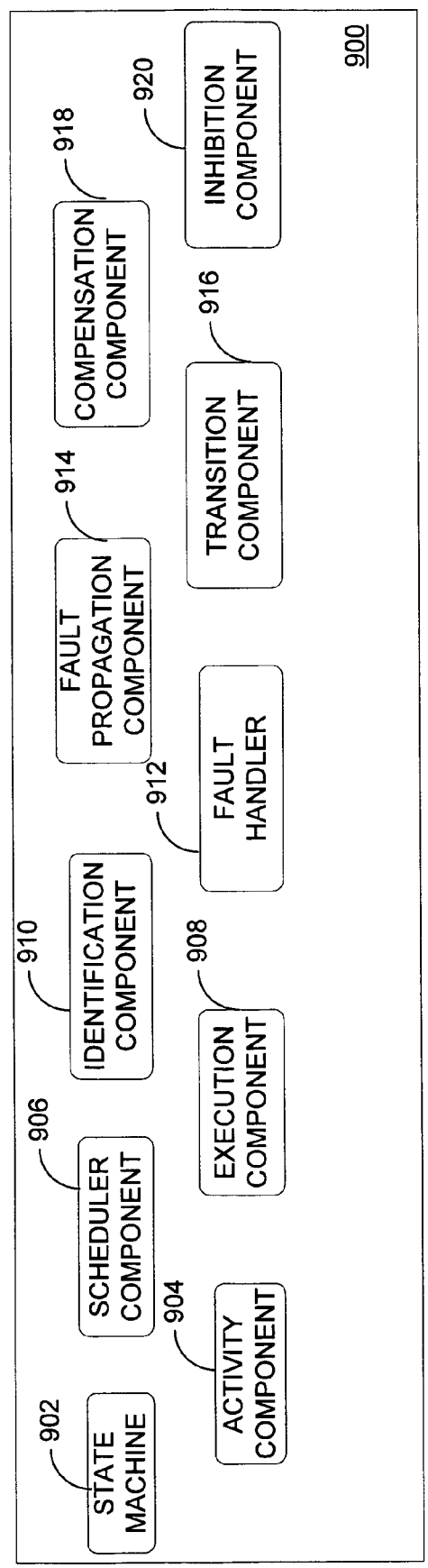
FIG. 9 is a block diagram illustrating an exemplary computer-readable medium on which aspects of the invention may be stored.

FIG. 8 is a flow diagram illustrating a method for asynchronously handling of a faulting event for an activity of a workflow according to an embodiment of the invention. For example, the method illustrated in FIG. 8 may be represented as computer-executable instructions to be stored in a computer-readable medium as shown in FIG. 9. For example, a state machine 902 defines a state automaton (e.g., state automaton 600) for an activity at 802, and the state automaton includes at least an executing state, a faulting state, and a closed state. An activity component 904 defines the activity to include a plurality of work items at 804. The defined activity has an execution hierarchy or an execution sequence (e.g., a tree structure) for the plurality of work items. Each of the work items including an operation for executing a portion of the activity.

A scheduler component 906 transitions each of the work items to the executing state at 806. An execution component 908 executes the included operation of transitioned work items in the executing state at 808. At 810, an identification component 910 identifies one or more of the transitioned work items in response to the faulting event based on the execution hierarchy and the included operation. At 812, a fault handler 912 asynchronously handles the faulting event by invoking a fault handling operation (e.g., the handleFault( ) function 716) in the one or more identified work items to transition the one or more identified work items to the faulting state while executing the included operation of the remaining transitioned work items not identified in response to the faulting event by the identification component. In one embodiment, the fault handler 912 asynchronously handles the faulting event by transitioning the one or more identified work items to the faulting state. In yet another embodiment, the fault handler 912 asynchronously handles the faulting event by enqueuing the one or more identified work items in a scheduler queue (e.g., scheduler queue 718).

In an alternative embodiment, the computer-readable medium 900 further includes a fault propagation component 914 for transmitting a notification from the one or more identified work items to the remaining transitioned work items as a function of the execution hierarchy of the activity. The notification 720 indicates that the identified one or more work items are in the faulting state. In a further embodiment, the computer-readable medium 900 further includes a transition component 916 for transitioning the remaining transitioned work items from the executing state to the faulting state in response to the transmitted notification.

The computer-readable medium may also include a compensation component 918 for recovering or compensating data associated with the activity as a function of the asynchronously handling the faulting event in yet another alternative embodiment. An inhibition component may also be part of the computer-readable medium 900 for suppressing the transmission of the notification to the remaining transitioned work items.

Although described in connection with an exemplary computing system environment, such as the system 400 in FIG. 4, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, the system 400 executes computer-executable instructions such as those illustrated in the figures, such as FIG. 8, to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

```
<myActivities:Sequence x:Name="myWorkflow" x:Class="myApp.myWorkflow"
  xmlns:myActivities="http://schemas.com/myActivities"
  xmlns:x="http://schemas.microsoft.com/winfx/2006/xaml"
  xmlns="http://schemas.microsoft.com/winfx/2006/xaml/workflow">
  <myActivities:WriteLine Text="One"/>
```

APPENDIX A-continued

```
    <myActivities:WriteLine Text="Two"/>
    <ThrowActivity FaultType="{x:Type InvalidOperationException}"/>
    <myActivities:WriteLine Text="Unreachable code"/>
    <FaultHandlersActivity>
        <FaultHandlerActivity FaultType="{x:Type InvalidOperationException}">
            <myActivities:WriteLine Text="Three"/>
        </FaultHandlerActivity>
        <FaultHandlerActivity FaultType="{x:Type
AppDomainUnloadedException}">
            <myActivities:WriteLine Text="Four"/>
        </FaultHandlerActivity>
    </FaultHandlersActivity>
</myActivities:Sequence>
<myActivities:Sequence x:Name="myWorkflow" x:Class="myApp.myWorkflow"
xmlns:myActivities="http://schemas.com/myActivities"
    xmlns:x="http://schemas.microsoft.com/winfx/2006/xaml"
    xmlns="http://schemas.microsoft.com/winfx/2006/xaml/workflow">
    <myActivities:WriteLine Text="Hello World"/>
    <ThrowActivity FaultType="{x:Type InvalidOperationException}" />
    <myActivities:WriteLine Text="Unreachable Code"/>
</myActivities:Sequence>
```

What is claimed is:

1. A computerized method for asynchronously handling a faulting event for an activity of a workflow, said workflow being processed by a computing device, said method comprising:

defining a state automaton for an activity, said state automaton including at least an executing state, a faulting state, and a closed state, said state automaton classifying an execution lifetime of the activity;

defining the activity to include a plurality of work items, said defined activity having an execution hierarchy for the plurality of work items, each of the work items including an operation for executing a portion of the activity;

transitioning each of the work items to the executing state;

executing the included operation of transitioned work items in the executing state;

receiving the faulting event associated with one or more work items;

identifying the one or more of the transitioned work items in response to a fault-handling operation that handles the received faulting event as a function of the execution hierarchy and the included operation, wherein each of the identified one or more of the transitioned work items including the fault-handling operation therein; and asynchronously handling the faulting event by executing the fault-handling operation associated with the each of the identified one or more of the transitioned work items to the faulting state in response to the received faulting event and transitioning the one or more identified work items to the faulting state while executing the included operation of the remaining transitioned work items not identified in response to the faulting event, wherein the one or more identified work items in the faulting state are transitioned to the closed state after execution of the fault-handling operation is completed.

2. The method of claim 1, wherein asynchronously handling the faulting event comprises invoking a fault handling operation in the one or more identified work items.

3. The method of claim 2, wherein invoking the fault handling operation comprises enqueuing the one or more identified work items in a scheduler queue.

4. The method of claim 1, further comprising propagating a notification from the one or more identified work items to the remaining transitioned work items as a function of the execution hierarchy of the activity, said notification indicating that the identified one or more work items being in the faulting state.

5. The method of claim 4, further comprising transitioning the remaining transitioned work items from the executing state to the faulting state in response to the propagated notification.

6. The method of claim 1, further comprising suppressing a notification from the one or more identified work items to the remaining transitioned work items as a function of the execution hierarchy of the activity such that the remaining transitioned worked items in the executing state continue to be executed.

7. The method of claim 1, further comprising providing operations to a user for post-faulting handling in response to the one or more identified work items being transitioned to the faulting state.

8. The method of claim 1, wherein one or more computer storage media have computer-executable instructions for performing the method of claim 1.

9. A system for asynchronously handling faulting events in a workflow, said system comprising:

a storage for storing data associated with work items of an activity in the workflow, said activity having an execution hierarchy for the work items, each of the work items including an operation for executing a portion of the activity;

a processor configured to execute computer-executable instructions for:

defining a state automaton for the activity, said state automaton including at least an executing state, a faulting state, and a closed state, said state automaton classifying an execution lifetime of the activity;

transitioning each of the work items to the executing state;

executing the included operation of transitioned work items in the executing state;

receiving a faulting event associated with one or more work items;

identifying the one or more of the transitioned work items in response to a fault-handling operation that handles the received faulting event based on the execution hierarchy and the included operation, wherein each of the identified one or more of the transitioned work items including the fault-handling operation therein; and asynchronously handling the faulting event by executing the fault-handling operation associated with the each of the identified one or more of the transitioned work items to the faulting state in response to the received faulting event and transitioning the one or more identified work items to the faulting state while executing the included operation of the remaining transitioned work items not identified in response to the faulting event, wherein the one or more identified work items in the faulting state are transitioned to the closed state after execution of the fault-handling operation is completed.

10. The system of claim 9, wherein the processor is configured to asynchronously handle the faulting event using one or more of the following method: by invoking a fault handling operation in the one or more identified work items, and by enqueuing the one or more identified work items in a scheduler queue.

11. The system of claim 9, wherein the processor is configured to execute computer-executable instructions embodied in a component for propagating a notification from the one or more identified work items to the remaining transitioned work items as a function of the execution hierarchy of the activity, said notification indicating that the identified one or more work items being in the faulting state.

12. The system of claim 11, wherein the processor is configured to execute computer-executable instructions embodied in a component for transitioning the remaining transitioned work items from the executing state to the faulting state in response to the propagated notification.

13. The system of claim 9, wherein the processor defines a compensating state in the state automaton and wherein the processor is configured to execute computer-executable instructions embodied in a component for transitioning the activities from the faulting state to the compensating state to recover data that was previously used for executing the remaining work items associated with the activity from the storage.

14. The system of claim 9, wherein the processor is configured to execute computer-executable instructions embodied in a component for suppressing the propagation of the notification to the remaining transitioned work items.

15. One or more computer storage media having computer-executable components for asynchronously handling a faulting event in a workflow, said computer-executable components comprising:

a state machine for defining a state automaton for the activity, said state automaton including at least an executing state, a faulting state, and a closed state, said state automaton classifying an execution lifetime of the activity;

an activity component for defining the activity to include a plurality of work items, said defined activity having an execution hierarchy for the plurality of work items, each of the work items including an operation for executing a portion of the activity;

a scheduler component for transitioning each of the work items to the executing state;

an execution component for executing the included operation of transitioned work items in the executing state;

an identification component for identifying one or more of the transitioned work items in response to a fault handling operation that handles the faulting event based on the execution hierarchy and the included operation, wherein each of the identified one or more of the transitioned work items including the fault handling operation therein; and a fault handler, in response to receiving the faulting event associated with one or more identified work items, for asynchronously handling the faulting event by invoking the fault handling operation in each of the identified one or more transitioned work items in response to the received faulting event to transition the one or more identified work items to the faulting state while executing the included operation of the remaining transitioned work items not identified in response to the faulting event by the identification component, wherein the one or more identified work items in the faulting state are transitioned to the closed state after execution of the fault handling operation is completed.

16. The computer storage media of claim 15, wherein the fault handler enqueues the one or more identified work items in a scheduler queue to transition the one or more identified work items to the faulting state.

17. The computer storage media of claim 15, further comprising a fault propagation component executable by a processor in a computing device for transmitting a notification from the one or more identified work items to the remaining transitioned work items as a function of the execution hierarchy of the activity, said notification indicating that the identified one or more work items being in the faulting state.

18. The computer storage media of claim 17, further comprising a transition component executable by a processor in a computing device for transitioning the remaining transitioned work items from the executing state to the faulting state in response to the transmitted notification.

19. The computer storage media of claim 15, further comprising a compensation component executable by a processor in a computing device for recovering data associated with the activity as a function of the asynchronously handling the faulting event.

20. The computer storage media of claim 15, further comprising an inhibition component executable by a processor in a computing device for suppressing the transmission of the notification to the remaining transitioned work items.

* * * * *